United States Patent
Hart et al.

(10) Patent No.: US 10,503,936 B2
(45) Date of Patent: Dec. 10, 2019

(54) SYSTEMS AND METHODS FOR UTILIZING MAGNETIC FINGERPRINTS OBTAINED USING MAGNETIC STRIPE CARD READERS TO DERIVE TRANSACTION TOKENS

(71) Applicant: MagTek, Inc., Seal Beach, CA (US)

(72) Inventors: Annmarie D. Hart, Manhattan Beach, CA (US); Roger Warren Applewhite, Palos Veredes Estates, CA (US)

(73) Assignee: MagTek, Inc., Seal Beach, CA (US)

( * ) Notice: Subject to any disclaimer, the term of this patent is extended or adjusted under 35 U.S.C. 154(b) by 0 days.

(21) Appl. No.: 15/907,173

(22) Filed: Feb. 27, 2018

(65) Prior Publication Data
US 2018/0253573 A1    Sep. 6, 2018

Related U.S. Application Data

(60) Provisional application No. 62/464,303, filed on Feb. 27, 2017.

(51) Int. Cl.
*G06K 7/08* (2006.01)
*H04L 9/32* (2006.01)
(Continued)

(52) U.S. Cl.
CPC ............ *G06K 7/087* (2013.01); *G06Q 20/34* (2013.01); *G06Q 20/3567* (2013.01);
(Continued)

(58) Field of Classification Search
CPC .................................. G06K 7/087; H04L 9/32
See application file for complete search history.

(56) References Cited

U.S. PATENT DOCUMENTS

| | | |
|---|---|---|
| 5,920,628 A | 7/1999 | Indeck et al. |
| 7,210,627 B2 | 5/2007 | Morley, Jr. et al. |

(Continued)

OTHER PUBLICATIONS

"Payment card number", Wkipedia, last modified Dec. 15, 2016, retrieved from https://web.archive.org/wiki/Payment_card_number on May 25, 2018, 6 pages.

(Continued)

*Primary Examiner* — Seung H Lee
(74) *Attorney, Agent, or Firm* — KPPB LLP

(57) ABSTRACT

Systems and methods for utilizing magnetic fingerprints obtained using magnetic stripe card readers to generate digital transaction tokens in accordance with embodiments of the invention are disclosed. In one embodiment, a method for authenticating a user using a digital token includes collecting user information and card information from an identification card containing an electronically readable component using a user authentication terminal, where the user information describes identifying information about a user and the card information describes information to uniquely identify the identification card, collecting session information using the user authentication terminal, wherein the session information describes information regarding a request for an authenticated communications session, generating a digital token based on the collected user information, the collected card information, and the collected session information using the user authentication terminal, and sending the digital token to a host access processor for authorization of an authentication request.

16 Claims, 8 Drawing Sheets

(51) Int. Cl.
*H04L 9/08* (2006.01)
*G06Q 20/34* (2012.01)
*G06Q 20/38* (2012.01)
*G07F 7/08* (2006.01)

(52) U.S. Cl.
CPC ......... *G06Q 20/385* (2013.01); *G07F 7/0873* (2013.01); *H04L 9/0866* (2013.01); *H04L 9/0869* (2013.01); *H04L 9/32* (2013.01); *H04L 9/3226* (2013.01); *H04L 2209/56* (2013.01)

(56) References Cited

U.S. PATENT DOCUMENTS

| | | | |
|---|---|---|---|
| 7,377,433 B2 | 5/2008 | Morley, Jr. et al. | |
| 7,478,751 B2 | 1/2009 | Morley, Jr. et al. | |
| 7,810,729 B2 | 10/2010 | Morley, Jr. et al. | |
| 7,896,248 B2 | 3/2011 | Morley et al. | |
| 8,447,991 B2 | 5/2013 | Hart et al. | |
| 8,533,123 B2* | 9/2013 | Hart | G06Q 30/0613 705/64 |
| 8,881,254 B2 | 11/2014 | Applewhite et al. | |
| 9,213,968 B2 | 12/2015 | Hart | |
| 2010/0097180 A1* | 4/2010 | Cardullo | G06Q 20/40145 340/5.83 |
| 2017/0039568 A1* | 2/2017 | Tunnell | G06Q 20/4014 |
| 2017/0262845 A1* | 9/2017 | Eisen | G06Q 20/401 |

OTHER PUBLICATIONS

"Security token", VVikipedia, last modified Oct. 15, 2016, retrieved from https://web.archive.org/web/20161017181053/https://en.wikipedia.org/wiki/Security_token on May 25, 2018, 7 pages.

"Tokenization (data security)", Wkipedia, last modified Feb. 24, 2017, retrieved from https://web.archive.org/web/20170225232103/http://en.wikipedia.org/wiki/Tokenization_(data_security) on May 25, 2018, 6 pages.

* cited by examiner

SYSTEMS AND METHODS FOR UTILIZING MAGNETIC FINGERPRINTS OBTAINED USING MAGNETIC STRIPE CARD READERS TO DERIVE TRANSACTION TOKENS

CROSS REFERENCE TO RELATED APPLICATIONS

The current application claims the benefit of U.S. Provisional Patent Application No. 62/464,303 entitled "Systems and Methods for Utilizing Magnetic Fingerprints Obtained Using Magnetic Stripe Card Readers to Derive Transaction Tokens" to Hart et al., filed Feb. 27, 2017, the disclosure of which is expressly incorporated by reference herein in its entirety.

FIELD OF THE INVENTION

The present invention relates to devices that read magnetic stripes and more specifically to generating digital transaction tokens in connection with transactions performed using a magnetic stripe.

BACKGROUND OF THE INVENTION

Magnetic stripe-bearing documents, for example credit cards, banking cards, debit cards, and identification cards are a type of data-bearing instrument commonly used in a variety of transactions. Account data is typically recorded on an electronically readable component on the card. In many cases, an electronically readable component is a stripe of magnetic material on the card. The data may include the issuing bank ID, account number, account holder's name, identification number, and/or security codes for the account and/or user.

When a magnetic stripe card, such as a credit card, is presented for payment, the magnetic stripe is read by a point-of-sale (POS) terminal, which extracts the data, sends it for validation to the bank, and waits for acceptance or rejection of the payment. If the transaction is accepted, the POS terminal may print a voucher (or obtains an electronic signature) and may print (or email) a receipt, and the merchant sees that the voucher is signed with the appropriate signature and provides the receipt with the purchased goods. The POS terminal can be a card reader or a device incorporating a card reader. A card reader typically includes at least a magnetic read head (or sensor) and supporting circuitry, such as a decoder and an encryption circuit.

The number on a credit card typically starts with six digits referred to as a bank identification number (BIN) and the remaining digits are referred to as the primary account number (PAN). Often the cardholder's name, the card expiration date, and a security code also appear on a credit card. The magnetic stripe on a credit card typically contains the PAN, cardholder name, and expiration date.

When a magnetic stripe card, such as an identification card, is presented for user authentication, the magnetic stripe can be read by a transaction terminal, which extracts the data, sends it for validation to an authentication server, and waits for acceptance or rejection of the user/s credentials. If the login attempt is approved, the transaction terminal may provide a confirmation notice such as an email or a notice placed on a computer screen. When the portal, to which access is sought, receives confirmation of the user authentication, the portal allows access to any protected or private areas being protected. A card reader typically includes at least a magnetic read head (or sensor) and supporting circuitry, such as a decoder and/or an encryption circuit.

Typically, a user's name, an expiration date, issue date, unique identification number, and the entity that provided the identification card (e.g., state, nation, or corporation) appear on an identification card. The magnetic stripe may include this information as well. A card reader typically includes at least a magnetic read head (or sensor) and supporting circuitry, such as a decoder and an encryption circuit.

SUMMARY OF THE INVENTION

Systems and methods for utilizing magnetic fingerprints obtained using magnetic stripe card readers to generate digital transaction tokens in accordance with embodiments of the invention are disclosed. In one embodiment, a method for authenticating a user using a digital token includes collecting user information and card information from an identification card containing an electronically readable component using a user authentication terminal, where the user information describes identifying information about a user and the card information describes information to uniquely identify the identification card, collecting session information using the user authentication terminal, wherein the session information describes information regarding a request for an authenticated communications session, generating a digital token based on the collected user information, the collected card information, and the collected session information using the user authentication terminal, and sending the digital token to a host access processor for authorization of an authentication request.

In a further embodiment, the method further includes encrypting the digital token.

In another embodiment, the collected user information includes at least one of a name of the cardholder, home address of the user, work address of the user, access permissions, access attempt location, biometric data and password.

In a still further embodiment, the session information includes at least one of login time, encrypted data, session identifier, and login location.

In still another embodiment, the electronically readable component is a magnetic stripe, the collected user information includes information encoded on the magnetic stripe, and the collected card information includes information from at least one of information encoded on the magnetic stripe and information describing an intrinsic characteristic of the magnetic stripe.

In a yet further embodiment, the intrinsic characteristic of the magnetic strip is a magnetic fingerprint representing a sequence identifying a unique remanent noise characteristic of the magnetic stripe.

In yet another embodiment, the fingerprint is a first derived fingerprint, where the first derived fingerprint is created by determining a maximum sequence depth of the sequence representing a unique remanent noise characteristic, identifying at least one pair of values within the sequence, wherein a first value within the at least one pair of values has an opposite sign in relation to a second value within the pair of values, and the first value and the second value have absolute values equal to the maximum sequence depth, exchanging the first value and the second value within the at least one pair of values within the sequence, repeating the swapping of pairs of values within the sequence until a threshold value of correlation of the sequence is reached, and applying a stochastic process to the sequence.

In a further embodiment again, the method includes creating a second derived fingerprint, wherein the second derived fingerprint is created by creating a second copy of the sequence representing a unique remanent noise characteristic and determining a maximum sequence depth of the second sequence, identifying at least one pair of values within the second sequence, wherein a first value within the at least one pair of values has an opposite sign in relation to a second value within the pair of values, and the first value and the second value have absolute values less than the maximum sequence depth, exchanging the first value and the second value within the at least one pair of values within the second sequence, repeating the swapping of pairs of values within the sequence until a threshold value of correlation of the sequence is reached and the set of swapped pairs is different from the set of swapped pairs of the first derived fingerprint, and applying a stochastic process to the second sequence, and generating a second digital token based on the collected user information, the collected card information, the collected session information, and the modified second sequence using the user authentication terminal.

In another embodiment, a method for authenticating a digital token used in a user authentication transaction includes receiving a digital token from a user authentication transaction terminal, extracting information from the digital token, wherein the information includes information describing a unique intrinsic characteristic of an electronically readable component of an identification card, user information, and session information, where the user information describes identifying information about a cardholder, and the session information describes information regarding a request for an authenticated communications session, comparing the extracted information describing the unique intrinsic characteristic to a reference description of the unique intrinsic characteristic, authorizing the user authentication transaction based at least some of the extracted information from the digital token, and returning a user authentication transaction result to the payment terminal, where a positive result is returned, if the extracted information describing the unique intrinsic characteristic matches the reference information describing the unique intrinsic characteristic and the at least one other piece of information is valid, and a negative result is returned, if the extracted information describing the unique intrinsic characteristic fails to match the reference description of the unique intrinsic characteristic or if the at least one other piece of information is not valid.

In a further additional embodiment, the digital token is encrypted, and the method further includes decrypting the digital token.

In another additional embodiment, the digital token includes authentication factors, where the authentication factors identify at least one of the group consisting of the cardholder and the payment card, and further includes verifying the authentication factors.

In a still yet further embodiment, the electronically readable component is a magnetic stripe.

In still yet another embodiment, the information describing the unique intrinsic characteristic is a transactional magnetic fingerprint representing a sequence identifying a unique remanent noise characteristic of the magnetic stripe, and the reference description is a reference magnetic fingerprint.

In a still further embodiment again, the user information includes at least one of a name of the cardholder, home address of the user, work address of the user, access permissions, access attempt location, biometric data and password.

In still another embodiment again, the session information includes at least one of login time, encrypted data, session identifier, and login location.

In a still further additional embodiment, the authentication factors includes at least one of a personal identification number (PIN), password, biometric data, and a unique number identifying the magnetic stripe card.

In still another additional embodiment, a method for processing a payment transaction using a digital token includes collecting cardholder information and card information from a payment card containing an electronically readable component using a payment terminal, where the cardholder information describes identifying information about a cardholder, and the card information describes information to uniquely identify the payment card, collecting transaction information using the payment terminal, wherein the transaction information describes information regarding a type and amount of a payment transaction, generating a digital token based on the collected cardholder information, the collected card information, and the collected transaction information using the payment terminal, and sending the digital token to a host transaction processor for authorization of the payment transaction.

In a yet further embodiment again, the method further includes encrypting the digital token.

In yet another embodiment again, the collected cardholder information includes at least one of a name of the cardholder, account information for an account associated with the cardholder, shipping address of the cardholder, and billing address of the cardholder.

In a yet further additional embodiment, the transaction information includes at least one of routing information for a beneficiary account, routing information for a destination account, a transaction amount, perso codes, and a session identifier.

In yet another additional embodiment, the electronically readable component is a magnetic stripe, the collected cardholder information includes information encoded on the magnetic stripe and the collected card information includes information from at least one of information encoded on the magnetic stripe and information describing an intrinsic characteristic of the magnetic stripe.

In a further additional embodiment again, the intrinsic characteristic of the magnetic strip is a magnetic fingerprint representing a sequence identifying a unique remanent noise characteristic of the magnetic stripe.

In another additional embodiment again, the fingerprint is a first derived fingerprint, where the first the derived fingerprint is created by determining a maximum sequence depth of the sequence representing a unique remanent noise characteristic, identifying at least one pair of values within the sequence, wherein a first value within the at least one pair of values has an opposite sign in relation to a second value within the pair of values, and the first value and the second value have absolute values equal to the maximum sequence depth, exchanging the first value and the second value within the at least one pair of values within the sequence repeating the swapping of pairs of values within the sequence until a threshold value of correlation of the sequence is reached, and applying a stochastic process to the sequence.

In a still yet further embodiment again, the method includes creating a second derived fingerprint, wherein the second derived fingerprint is created by creating a second copy of the sequence representing a unique remanent noise characteristic and determining a maximum sequence depth of the second sequence, identifying at least one pair of values within the second sequence, wherein a first value within the at least one pair of values has an opposite sign in relation to a second value within the pair of values, and the first value and the second value have absolute values less than the maximum sequence depth, exchanging the first value and the second value within the at least one pair of values within the second sequence, repeating the swapping of pairs of values within the sequence until a threshold value of correlation of the sequence is reached and the set of swapped pairs is different from the set of swapped pairs of the first derived fingerprint, and applying a stochastic process to the second sequence, and generating a second digital token based on the collected user information, the collected card information, the collected session information, and the modified second sequence using the user authentication terminal.

In still yet another embodiment again, a system for processing a payment transaction using a digital token includes a processor and memory, where the memory is connected to the processor and contains instructions to direct the processor to collect cardholder information and card information from a payment card containing an electronically readable component using a payment terminal, where the cardholder information describes a cardholder and the card information describes information to uniquely identify the payment card, collect transaction information using the payment terminal, wherein the transaction information describes information regarding the type and amount of a payment transaction, generate a digital token based on the collected cardholder information, the collected card information, and the collected transaction information using the payment terminal, and send the digital token to a host transaction processor for authorization of the payment transaction.

In a still yet further additional embodiment, the memory further includes instructions to direct the processor to encrypt the digital token.

In still yet another additional embodiment, the collected cardholder information includes at least one of a name of the cardholder, account information for an account associated with the cardholder, shipping address of the cardholder, and billing address of the cardholder.

In a yet further additional embodiment again, the transaction information includes at least one of routing information for a beneficiary account, routing information for a destination account, a transaction amount, perso codes, and a session identifier.

In yet another additional embodiment again, the electronically readable component is a magnetic stripe, the collected cardholder information includes information encoded on the magnetic stripe, and the collected card information includes information from at least one of information encoded on the magnetic stripe and information describing an intrinsic characteristic of the magnetic stripe.

In a still yet further additional embodiment again, the intrinsic characteristic of the magnetic stripe is a magnetic fingerprint representing a sequence identifying a unique remanent noise characteristic of the magnetic stripe.

In still yet another additional embodiment again, the fingerprint is a first derived fingerprint, and the memory contains instructions to create the first derived fingerprint, which direct the processor to determine a maximum sequence depth of the sequence representing a unique remanent noise characteristic identify at least one pair of values within the sequence, wherein a first value within the at least one pair of values has an opposite sign in relation to a second value within the pair of values, and the first value and the second value have absolute values equal to the maximum sequence depth, exchange the first value and the second value within the at least one pair of values within the sequence, repeat the swapping of pairs of values within the sequence until a threshold value of correlation of the sequence is reached, and apply a stochastic process to the sequence.

In another further embodiment, the memory further comprises instructions to direct the processor to create a second derived fingerprint, wherein the second derived fingerprint is created by creating a second copy of the sequence representing a unique remanent noise characteristic and determining a maximum sequence depth of the second sequence, identifying at least one pair of values within the second sequence, wherein a first value within the at least one pair of values has an opposite sign in relation to a second value within the pair of values, and the first value and the second value have absolute values less than the maximum sequence depth, exchanging the first value and the second value within the at least one pair of values within the second sequence, repeating the swapping of pairs of values within the sequence until a threshold value of correlation of the sequence is reached and the set of swapped pairs is different from the set of swapped pairs of the first derived fingerprint, and applying a stochastic process to the sequence, and generate a second digital token based on the collected user information, the collected card information, the collected session information, and the modified second sequence using the user authentication terminal.

In still another further embodiment, a method for authenticating a digital token used in a payment transaction includes receiving a digital token from a payment transaction terminal, extracting information from the digital token, wherein the information includes information describing a unique intrinsic characteristic of an electronically readable component of a payment card, cardholder information, and transaction information, where the cardholder information describes identifying information about a cardholder and the transaction information describes information regarding the type and amount of a payment transaction, comparing the extracted information describing the unique intrinsic characteristic to a reference description of the unique intrinsic characteristic, authorizing the payment transaction based on at least some of the extracted information from the digital token, and returning a payment transaction result to the payment terminal, where a positive result is returned, if the extracted information describing the unique intrinsic characteristic matches the reference information describing the unique intrinsic characteristic and the at least one other piece of information is valid and a negative result is returned, if the extracted information describing the unique intrinsic characteristic fails to match the reference description of the unique intrinsic characteristic or if the at least one other piece of information is not valid.

In yet another further embodiment, the digital token is encrypted and the method further includes decrypting the digital token.

In another further embodiment again, the digital token includes authentication factors, where the authentication factors identify at least one of the cardholder and the payment card, and further includes verifying the authentication factors.

In another further additional embodiment, the electronically readable component is a magnetic stripe.

In yet another further additional embodiment, the information describing the unique intrinsic characteristic is a transactional magnetic fingerprint representing a sequence identifying a unique remanent noise characteristic of the magnetic stripe, and the reference description is a reference magnetic fingerprint.

In still another further additional embodiment, the cardholder information includes at least one of a name of the cardholder, account information for an account associated with the cardholder, shipping address of the cardholder, and billing address of the cardholder.

In still yet another additional embodiment, the transaction information includes at least one of routing information for a beneficiary account, routing information for a destination account, a transaction amount, perso codes, and a session identifier.

In still further another additional embodiment, the authentication factors includes at least one of a personal identification number (PIN), password, biometric data, and a unique number identifying the magnetic stripe card.

DETAILED DISCLOSURE OF THE INVENTION

Figure 1A:
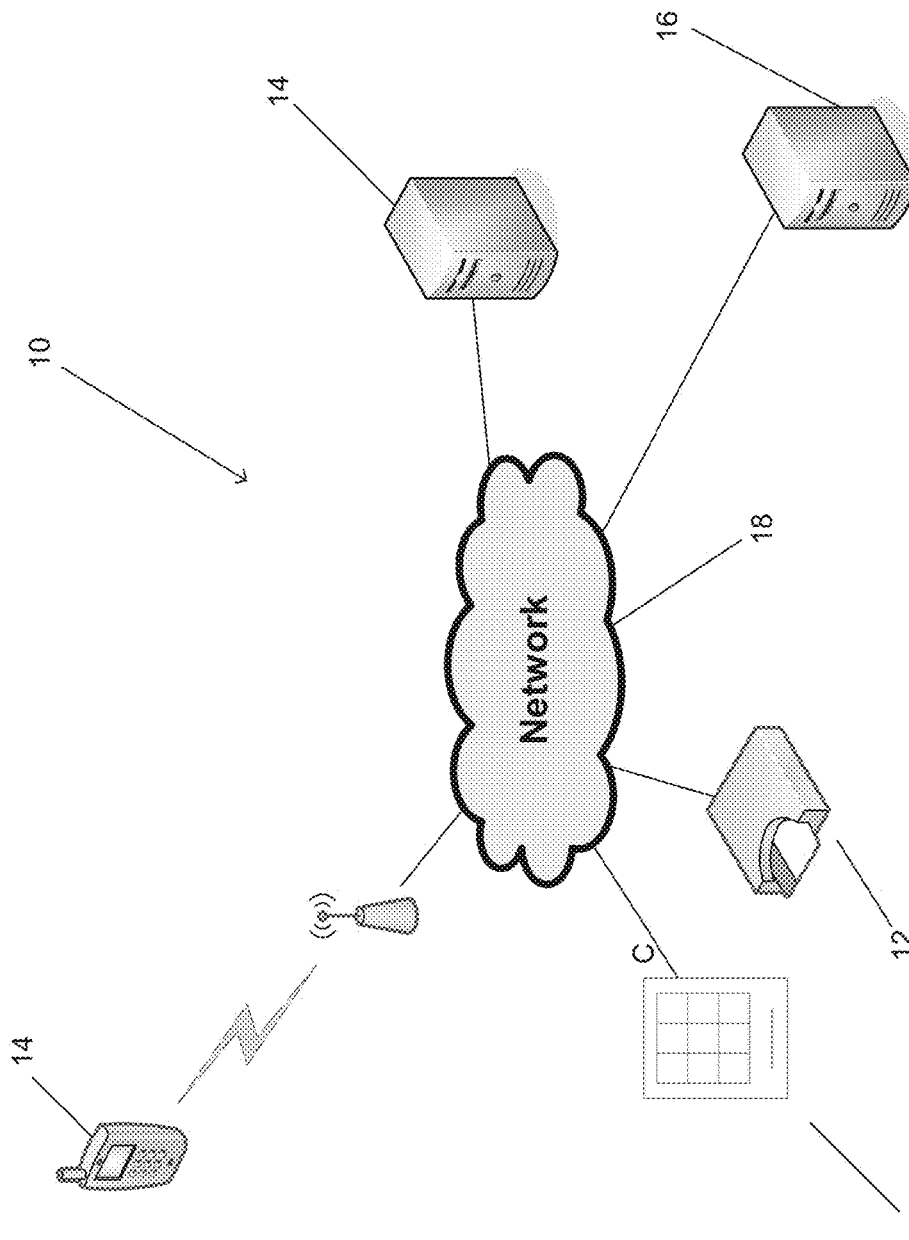
FIG. 1A illustrates a network diagram of a purchase transaction authorization system in accordance with an embodiment of the invention.

Turning now to the drawings, systems and methods for generating a self-encapsulated digital transaction token in accordance with embodiments of the invention are described. By transmitting a digital token rather than unsecured cardholder data, a transaction may be conducted with minimal exposure to cardholder data theft and fraud. In additional embodiments of the invention, similar information may be utilized to generate a digital authentication token from a cardholder's identification card.

The information printed on a credit card, identification card, or other transaction card and stored in a magnetic stripe on such a card is often used in conducting a transaction using the card. The ease of access to this information facilitates simple and convenient transactions for users. However, it also leads to many security risks and fraud involving the misuse of cardholder data is prevalent. Tokenization often refers to the creation of an artificial number that can be printed, stored, and/or transmitted in place of the true number. In several embodiments of the invention, the use of a digital token avoids placing personally identifiable information and/or personal account number in an insecure human and/or electronically readable form. A digital token generated in accordance with many embodiments of the invention is an encrypted, self-encapsulated, self-authenticating token that may be used to facilitate a transaction.

Cardholder information can be made even more secure by not storing or displaying any traditional personalization information that can be used to identify the cardholder or cardholder's account, such as a personal identification number, password, biometric data, a bank identification number (BIN), a primary account number (PAN), or security code. Card information may be information to identify the physical card. The card information may be encoded on the electronically readable component, such as a credit or debit card number encoded on a magnetic stripe, or the card information may be a unique intrinsic characteristic about the card, such as magnetic fingerprint. A non-standard payment or identification card having these characteristics may instead store a serial number or seed number that can be used to generate a digital token. Processes for generating a digital token for payment transactions using a non-standard payment card are described in U.S. Pat. No. 9,213,968 to Hart, the disclosure from which relevant to conducting a transaction using a digital token generated from a non-standard payment card is hereby incorporated by reference in its entirety. In many embodiments, a digital token may be created from a magnetic stripe card that may be a non-standard payment or identification card. As will be discussed further below, a process for generating a digital token may utilize a serial number or seed number stored on the magnetic stripe of the card rather than a personal account number or other personal identifier. Furthermore, additional digital tokens different from a previous token can be created by utilizing different authorization factors and/or magnetic fingerprints in token generation.

Many secure magnetic stripe readers include components such as a magnetic read head connected to a decoder circuit, which may be itself connected to an encryption engine. Some secure magnetic stripe readers also include a magnetic fingerprint circuit that detects unique magnetic characteristics of each particular magnetic stripe. In several embodiments of the invention, secure magnetic stripe readers for generating digital tokens can generate a transactional magnetic fingerprint from magnetic characteristics and utilize the transactional magnetic fingerprint in generating a digital token. In further embodiments, additional magnetic fingerprints, referred to as derived magnetic fingerprints, can be generated from a transactional magnetic fingerprint or from a stored reference magnetic fingerprint and used in lieu of a transactional magnetic fingerprint. A derived magnetic fingerprint can be used in a process to create a digital token that differs from a digital token created using an initial or different derived magnetic fingerprint.

In addition, processes for authenticating a magnetic fingerprint often utilize the correlation between the magnetic fingerprint and a reference magnetic fingerprint. A reference magnetic fingerprint may be stored, for example, from an initial swipe of a magnetic stripe card and indexed by an identifier associated with the magnetic stripe card such as the serial number. When a magnetic fingerprint is received for a new comparison and the magnetic fingerprint had been received previously, the transaction may be typically flagged as fraudulent because the likelihood of the same magnetic fingerprint being generated from a subsequent swipe of the same magnetic stripe is statistically very small. Therefore, the generation of derived magnetic fingerprints that are different, but have a sufficient correlation to a reference magnetic fingerprint allows the use of digital tokens that do not contain the same magnetic fingerprint and will not be flagged as fraudulent. Furthermore, magnetic fingerprints can be derived when a card is not present enabling more secure transactions, when the physical card is not present and/or not utilized to generate the specific magnetic fingerprint data utilized in the authentication of the transaction. Magnetic stripe readers and terminals for generating a digital token in accordance with embodiments of the invention are discussed below.

Further, secure communications may not exist between the point of a payment or a user authentication transaction. In some embodiments, applying a stochastic function to a derived magnetic fingerprint and/or an encryption process to encrypt a digital token in a secure processing environment allows for security to exist between a user seeking authentication or a cardholder making a purchase and the authentication or payment processor. Using such an encryption and security scheme allows for the secure transfer of a derived magnetic fingerprint or an encrypted digital token through unsecured communication channels or storage on an unsecured device.

Magnetic Stripe Payment System

A system for conducting a purchase transaction using a digital token in accordance with embodiments of the invention is illustrated in FIG. 1A. The system 10 includes card readers and payment terminals 12, mobile payment terminal 14, payment host server 14, and fingerprint authentication server 16. The various devices may communicate over network 18. In many embodiments of the invention, a magnetic stripe card may be read using any of a variety of devices that include a magnetic card reader such as, but not limited to, a point-of-sale computer, personal computer, and/or mobile device (such as a cell phone or tablet). In some embodiments, a digital token may be transferred to a device that does not include a magnetic card reader.

A serial number (or seed number) and/or a magnetic fingerprint read from the magnetic stripe card can be used in combination with other authentication factors to generate a digital token as will be discussed further below. In some embodiments, the payment terminal that reads the magnetic stripe card generates the digital token. In other embodiments, the serial number (or seed number), magnetic fingerprint, and/or other authentication factors are sent to a payment host server 14 that generates the digital token. In several embodiments, a derived magnetic fingerprint may be generated from the magnetic fingerprint that was read from the magnetic stripe card and the derived magnetic fingerprint may be used in creating the digital token. A magnetic fingerprint that may be embedded in a digital token may be authenticated with a fingerprint authentication server 16. While specific devices for generating digital tokens and derived magnetic fingerprints are discussed above with respect to FIG. 1A, any of a variety of transaction systems that implement the methods described herein can be utilized in accordance with various embodiments of the invention. Payment terminals for reading a magnetic stripe in accordance with many embodiments of the invention is discussed below.

Magnetic Stripe User Authentication System

Figure 1B:
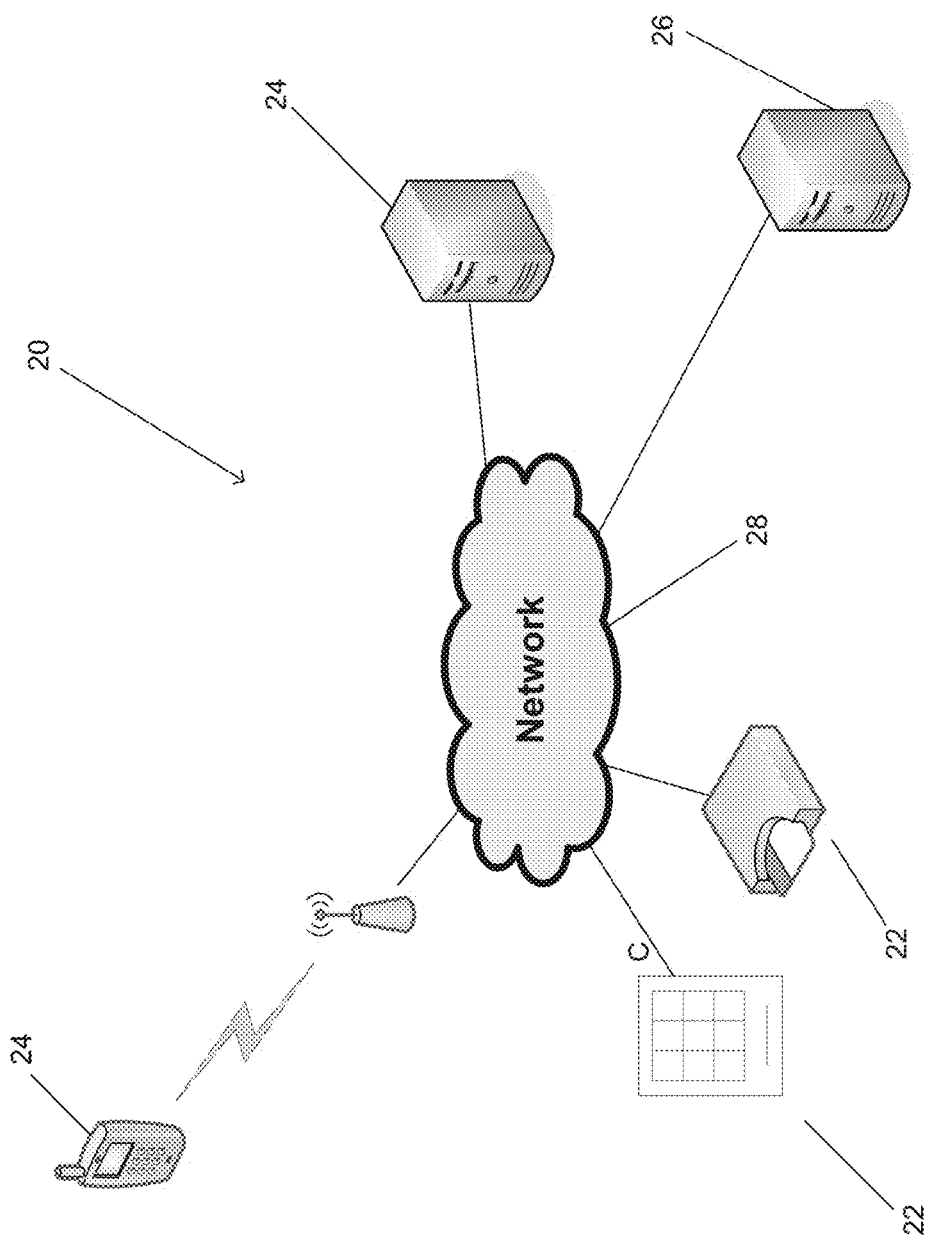
FIG. 1B illustrates a network diagram of a user authentication system in accordance with an embodiment of the invention.

A system for conducting user authentication using a digital token in accordance with embodiments of the invention is illustrated in FIG. 1B. The system 20 includes card readers and user authentication terminals 22, mobile user authentication terminals 24, user authentication host server 24, and fingerprint authentication server 26. The various devices may communicate over network 28. In many embodiments of the invention, a magnetic stripe card may be read using any of a variety of devices that include a magnetic card reader such as, but not limited to, a personal computer, and/or mobile device (such as a cell phone or tablet). In some embodiments, a digital token may be transferred to a device that does not include a magnetic card reader.

A serial number (or seed number) and a magnetic fingerprint read from the magnetic stripe card can be used in combination with other authentication factors to generate a digital token as will be discussed further below. In some embodiments, the user authentication terminal that reads the magnetic stripe card generates the digital token. In other embodiments, the serial number (or seed number), magnetic fingerprint, and/or other authentication factors are sent to a host server 14 that generates the digital token. In several embodiments, a derived magnetic fingerprint may be generated from the magnetic fingerprint that was read from the magnetic stripe card and the derived magnetic fingerprint may be used in creating the digital token. A magnetic fingerprint that may be embedded in a digital token may be authenticated with a fingerprint authentication server 26. While specific devices for generating digital tokens and derived magnetic fingerprints are discussed above with respect to FIG. 1B, any of a variety of transaction systems that implement the methods described herein can be utilized in accordance with various embodiments of the invention. User authentication terminals for reading a magnetic stripe in accordance with many embodiments of the invention is discussed below.

Payment Terminal

Figure 2A:
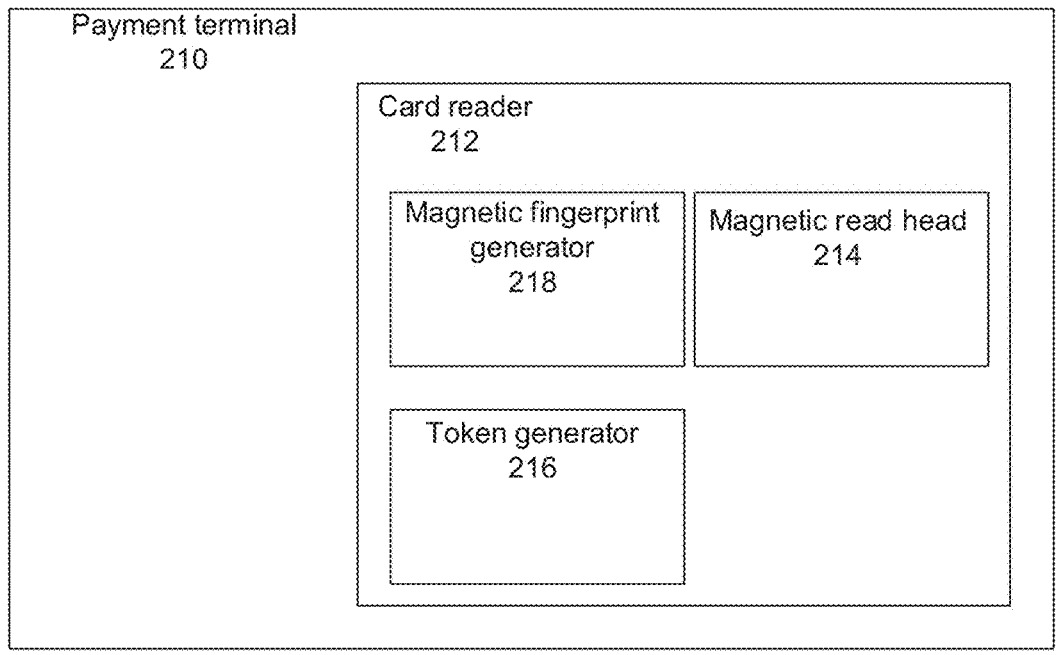
FIG. 2A illustrates a block diagram of a payment terminal in accordance with an embodiment of the invention.
Figure 2B:
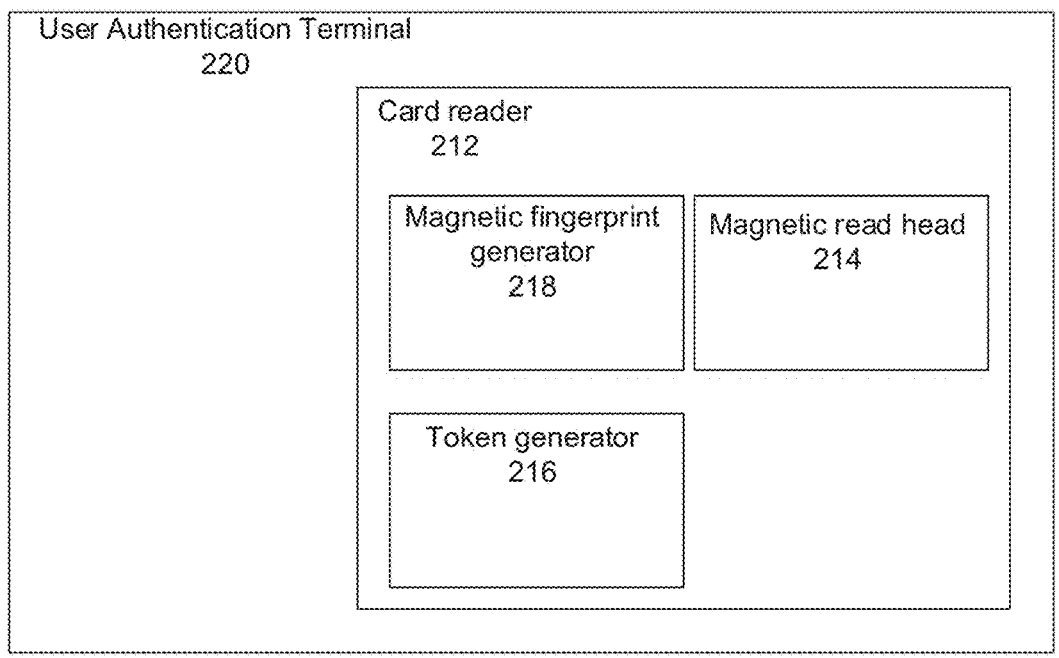
FIG. 2B illustrates a block diagram of a user authentication terminal in accordance with an embodiment of the invention.

In many embodiments of the invention, a payment terminal includes a card reader capable of generating a digital token upon reading a magnetic stripe. A payment terminal in accordance with an embodiment of the invention is conceptually illustrated in FIG. 2. The payment terminal 210 may include a card reader 212. Card reader 212 includes a magnetic read head 214, a token generator 216, and a magnetic fingerprint generator 218. Magnetic read head 214 may be configured to read the magnetic stripe on a magnetic stripe card, which may be accomplished in various embodiments by swiping a card or inserting a card into the reader. Fingerprint generator 218 may be configured to generate a magnetic fingerprint from the repeatable magnetic characteristics of a magnetic stripe. Token generator 216 may be configured to generate a digital token from cardholder information, card information, and transaction information as will be discussed in greater detail further below. Although specific payment terminal architectures are discussed above with respect to FIG. 2, any of a variety of configurations may be utilized in accordance with various embodiments of the invention. A digital token may be transmitted to a payment host server for processing as discussed below.

User Authentication Terminal

In many embodiments of the invention, a user authentication terminal includes a card reader capable of generating a digital token upon reading a magnetic stripe. A user authentication terminal in accordance with an embodiment of the invention is conceptually illustrated in FIG. 2B. The user authentication terminal 220 may include a card reader 212. Card reader 212 includes a magnetic read head 214, a token generator 216, and a magnetic fingerprint generator 218. Magnetic read head 214 may be configured to read the magnetic stripe on a magnetic stripe card, which may be accomplished in various embodiments by swiping a card or inserting a card into the reader. Fingerprint generator 218 may be configured to generate a magnetic fingerprint from the repeatable magnetic characteristics of a magnetic stripe. Token generator 216 may be configured to generate a digital token from user information, card information, and session information as will be discussed in greater detail further below. In various embodiments of the invention, a user authentication terminal may be a personal computer (PC), smart phone or mobile device (e.g., tablet), or other computing device. Although specific user authentication terminal architectures are discussed above with respect to FIG. 2B, any of a variety of configurations may be utilized in accordance with various embodiments of the invention. A digital token may be transmitted to a host server for processing as discussed below.

Host Servers

Figure 3:
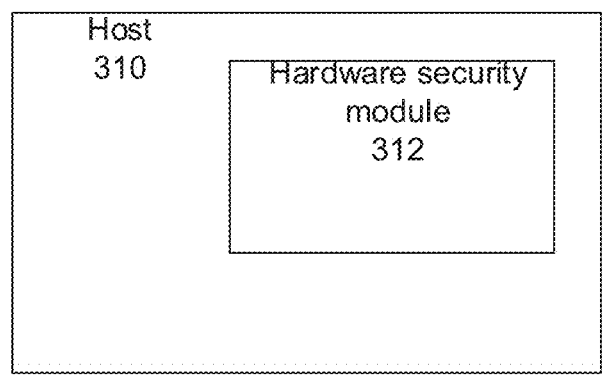
FIG. 3 illustrates a block diagram of a host server in accordance with an embodiment of the invention.

In many embodiments of the invention, a payment or user authentication terminal transmits a digital token in connection with a transaction to a payment host server for authenticating and processing of the digital token. A host server in accordance with an embodiment of the invention is conceptually illustrated in FIG. 3. The host server 310 may include a hardware security module 312 configured to receive a digital token, decrypt the digital token, extract authentication factors from the digital token, and authorize the requested transaction as will be discussed in greater detail further below. Although specific host server architectures are described above with respect to FIG. 3, any of a variety of configurations may be utilized in accordance with various embodiments of the invention. Processes for generating a digital token in accordance with embodiments of the invention are discussed below.

Generating a Digital Token For a Payment Transaction

Figure 4A:
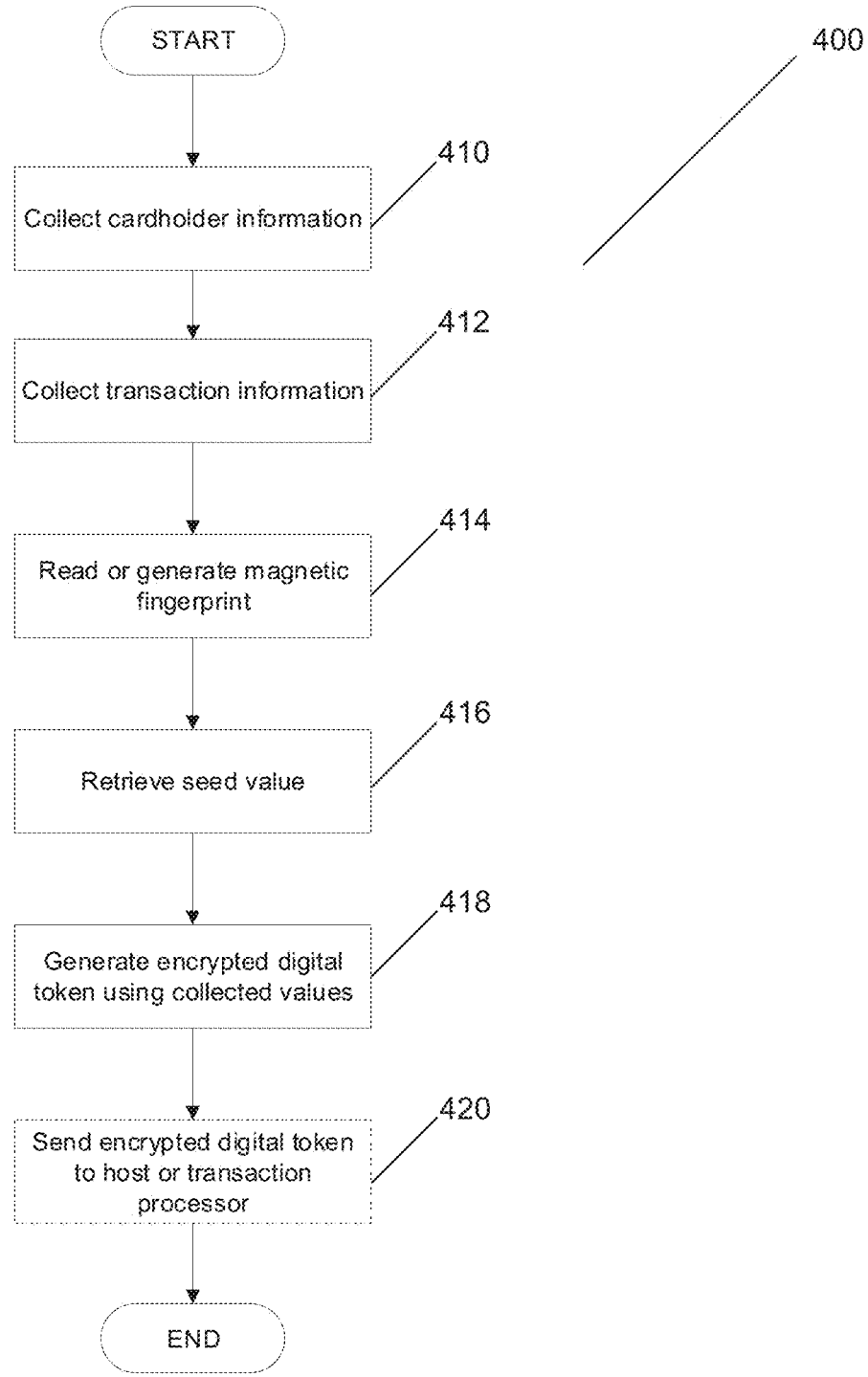
FIG. 4A illustrates a flow diagram for a process performed by a payment terminal to generate a digital token for a payment transaction in accordance with an embodiment of the invention.

A process for generating a digital token in accordance with an embodiment of the invention is illustrated in FIG. 4A. In several embodiments of the invention, one or more actions in the process are performed by a payment terminal or other computing device. In some embodiments, the process includes associating a virtual object to a physical token, such as magnetic stripe card, and/or utilizing a physical token that may be already associated with a virtual object. Linking virtual objects to physical tokens, such as a card containing a magnetic strip is described in U.S. Pat. No. 8,881,254 entitled "Method and System for Managing Virtual Objects in a Network," the disclosure of which relevant to linking a virtual object to a physical item is hereby incorporated by reference in its entirety. The process 400 includes collecting (410) cardholder information and card information. Cardholder information may include, but is not limited to, an identity of the cardholder by name or by a unique identifier string, account information for an account associated with the user, shipping address of the cardholder, billing address of the cardholder, and/or any other information that may be associated with a cardholder. Account information may include information such as, but not limited to, a routing number, an account number, and/or any other identifier(s) for an account. Card information may include but is not limited to a unique number associated with the magnetic stripe card and/or a unique intrinsic characteristic of the card. A unique intrinsic characteristic of a card may be a unique remanent noise characteristic of the magnetic stripe.

The process 400 includes collecting (412) transaction information. Transaction information may include information such as, but not limited to, routing information for a beneficiary/destination account, transaction amount, encrypted data, perso codes, session identifier (ID), shipping address, billing address, and/or other information concerning a purchase or other type of a transaction performed using the magnetic stripe card.

The process can include reading or generating (414) a transactional magnetic fingerprint from the magnetic stripe card. The intrinsic magnetic characteristic can be derived from a unique remanent noise characteristic of the card that is related to the magnetic material that forms the magnetic stripe (i.e. is not a signal that is written to the magnetic stripe) and can be repeatedly read. Systems and methods for sensing the noise characteristic and generating a magnetic fingerprint include those disclosed in U.S. Pat. No. 7,478, 751 entitled "Method and Apparatus for Authenticating a Magnetic Fingerprint Signal Using a Filter Capable of Isolating a Remanent Noise Related Signal Component", U.S. Pat. No. 7,377,433 entitled "Method and Apparatus for Authenticating a Magnetic Fingerprint Signal Using Compressive Amplification," and U.S. Pat. No. 7,210,627 entitled "Method and Apparatus for Authenticating a Magnetic Fingerprint Signal Using an Adaptive Analog to Digital Converter," the disclosures from which relevant to sensing a noise characteristic and generating a magnetic fingerprint are hereby incorporated by reference in their entirety. The transactional magnetic fingerprint can be transmitted to a server or other device that stores a copy of the magnetic fingerprint or a reference magnetic fingerprint for comparison.

A seed value may be read (416) from the magnetic stripe card. The seed value may be a numeric or alphanumeric string of arbitrary length that may be used in generating the digital token. In some embodiments, the seed value may be an identifier for a virtual object associated with the magnetic stripe card.

The process may generate (418) a digital token from the collected information. In many embodiments, the digital token may be generated by encrypting the collected information using symmetric or asymmetric encryption schemes, such as advance encryption standard (AES) or triple data encryption standard (Triple DES). The encryption keys can be managed using a key management scheme, such as Derived Unique Key Per Transaction (DUKPT) or other scheme as appropriate to the requirements of a particular application. In many embodiments, the use of a management scheme may allow for a new key to be created for each layer of encryption and/or each individual transaction. In some embodiments, the card reader, payment terminal, personal computer, or other device from which a transaction may be initiated may be used to generate the digital token. In other embodiments, some or all of the collected information may be sent securely to a host server that generates the digital token and returns the digital token to the card reader, payment terminal, personal computer, mobile device, and/or other device from which a transaction may be initiated. The digital token can then be sent to the host server to complete the transaction.

In additional embodiments, one or more digital tokens can be created and stored on the payment device for use in future transactions and, in particular, transaction in which the card may not be available to acquire a new magnetic fingerprint and the increased security of use of an encrypted token may be desirable. As described further below, additional different magnetic fingerprints, referred to as derived magnetic fingerprints, can be generated from an original magnetic fingerprint. Additional digital tokens may be created that differ from a previous digital token by using derived magnetic fingerprints and/or other authentication factors that are different than those used in a previous generated digital token.

The encrypted digital token may be sent (420) to a host or transaction processor for authorization of a transaction. Although a specific process is described above with respect to FIG. 4A, any of a variety of processes may be utilized for generating a digital token in accordance with embodiments of the invention. Processes for generating a digital token for user authentication in accordance with many embodiments of the invention are discussed below.

Generating a Digital Token For User Authentication

Figure 4B:
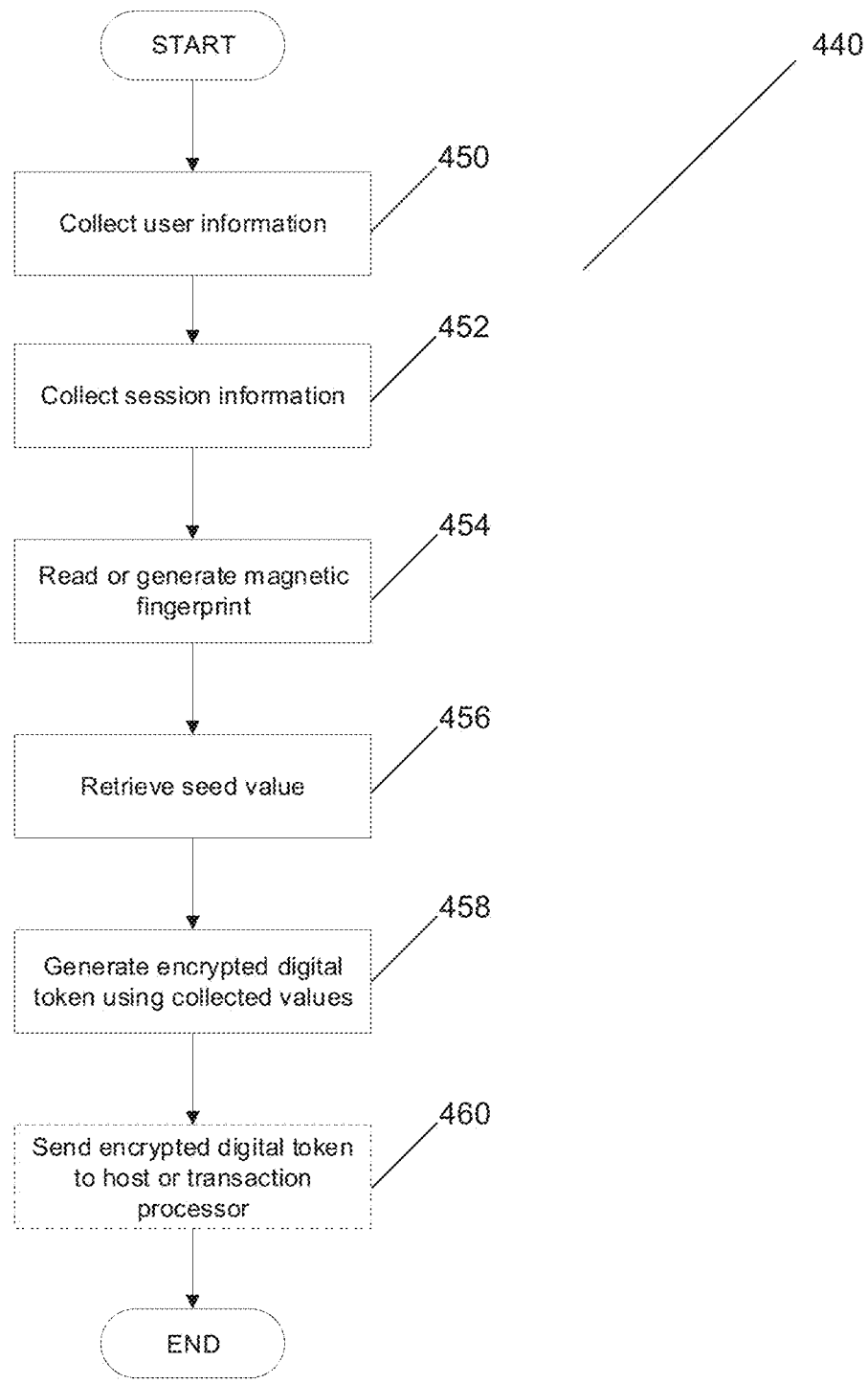
FIG. 4B illustrates a flow diagram for a process performed by a user authentication terminal to generate a digital token for a user authentication transaction in accordance with an embodiment of the invention.

A process for generating a digital token in accordance with an embodiment of the invention is illustrated in FIG. 4B. In several embodiments of the invention, one or more actions in the process are performed by a user authentication terminal or other computing device. In some embodiments, the process includes associating a virtual object to a physical token, such as magnetic stripe card, and/or utilizing a physical token that may be already associated with a virtual object. Linking virtual objects to physical tokens, such as a card containing a magnetic strip is described in U.S. Pat. No. 8,881,254 entitled "Method and System for Managing Virtual Objects in a Network," the disclosure of which relevant to linking a virtual object to a physical item is hereby incorporated by reference in its entirety. The process 440 includes collecting user information (450). User information may include, but is not limited to, an identity of the user by name or by a unique identifier string, home address of the user, work address of the user, access permissions, access attempt location, biometric data, password, and/or any other information that may be associated with a cardholder. Card information may include but is not limited to a unique number associated with the magnetic stripe card and/or a unique intrinsic characteristic of the card. A unique intrinsic characteristic of a card may be a unique remanent noise characteristic of the magnetic stripe.

The process 440 includes collecting session information (452). Session information may include information such as, but not limited to, login time, encrypted data, session identifier (ID), login location, and/or other information concerning user authentication using the magnetic stripe card.

The process can include reading or generating (454) a transactional magnetic fingerprint from the magnetic stripe card. The intrinsic magnetic characteristic can be derived from a unique remanent noise characteristic of the card that is related to the magnetic material that forms the magnetic stripe (i.e. is not a signal that is written to the magnetic stripe) and can be repeatedly read. Systems and methods for sensing the noise characteristic and generating a magnetic fingerprint include those disclosed in U.S. Pat. No. 7,478, 751 entitled "Method and Apparatus for Authenticating a Magnetic Fingerprint Signal Using a Filter Capable of Isolating a Remanent Noise Related Signal Component", U.S. Pat. No. 7,377,433 entitled "Method and Apparatus for Authenticating a Magnetic Fingerprint Signal Using Compressive Amplification", and U.S. Pat. No. 7,210,627 entitled Method and Apparatus for Authenticating a Magnetic Fingerprint Signal Using an Adaptive Analog to Digital Converter", the disclosure from which relevant to sensing a noise characteristic and generating a magnetic fingerprint is hereby incorporated by reference in its entirety. The transactional magnetic fingerprint can be transmitted to a server or other device that stores a copy of the magnetic fingerprint or a reference magnetic fingerprint for comparison.

A seed value may be read (456) from the magnetic stripe card. The seed value may be a numeric or alphanumeric string of arbitrary length that may be used in generating the digital token. In some embodiments, the seed value may be an identifier for a virtual object associated with the magnetic stripe card.

The process generates (458) a digital token from the collected information. In many embodiments, the digital token may be generated by encrypting the collected information using symmetric or asymmetric encryption schemes, such as advance encryption standard (AES) or triple data encryption standard (Triple DES). The encryption keys can be managed using a key management scheme, such as Derived Unique Key Per Transaction (DUKPT) or other scheme as appropriate to the requirements of a particular application. In many embodiments, the use of a management scheme may allow for a new key to be created for each layer of encryption and/or each individual transaction. In some embodiments, the card reader, user authentication terminal, personal computer, or other device from which user authentication is initiated may be used to generate the digital token. In other embodiments, some or all of the collected information may be sent securely to a host server that generates the digital token and returns the digital token to the card reader, user authentication terminal, personal computer, mobile device, and/or other device from which a transaction may be initiated. The digital token can then be sent to the host server to complete the transaction.

In additional embodiments, one or more digital tokens can be created and stored on the payment device for use in future transactions and, in particular, transaction in which the card may not be available to acquire a new magnetic fingerprint and the increased security of use of an encrypted token may be desirable. As described further below, additional different magnetic fingerprints, referred to as derived magnetic fingerprints, can be generated from an original magnetic fingerprint. Additional digital tokens may be created that differ from a previous digital token by using derived magnetic fingerprints and/or other authentication factors that are different than those used in a previous generate a digital token.

The encrypted digital token may be sent (460) to a host or transaction processor for authentication of a user. Although a specific process is described above with respect to FIG. 4B, any of a variety of processes may be utilized for generating a digital token in accordance with embodiments of the invention. The receipt and processing of a digital token by a user authentication host server in accordance with embodiments of the invention is discussed below.

Receiving and Processing a Digital Token

Figure 5:
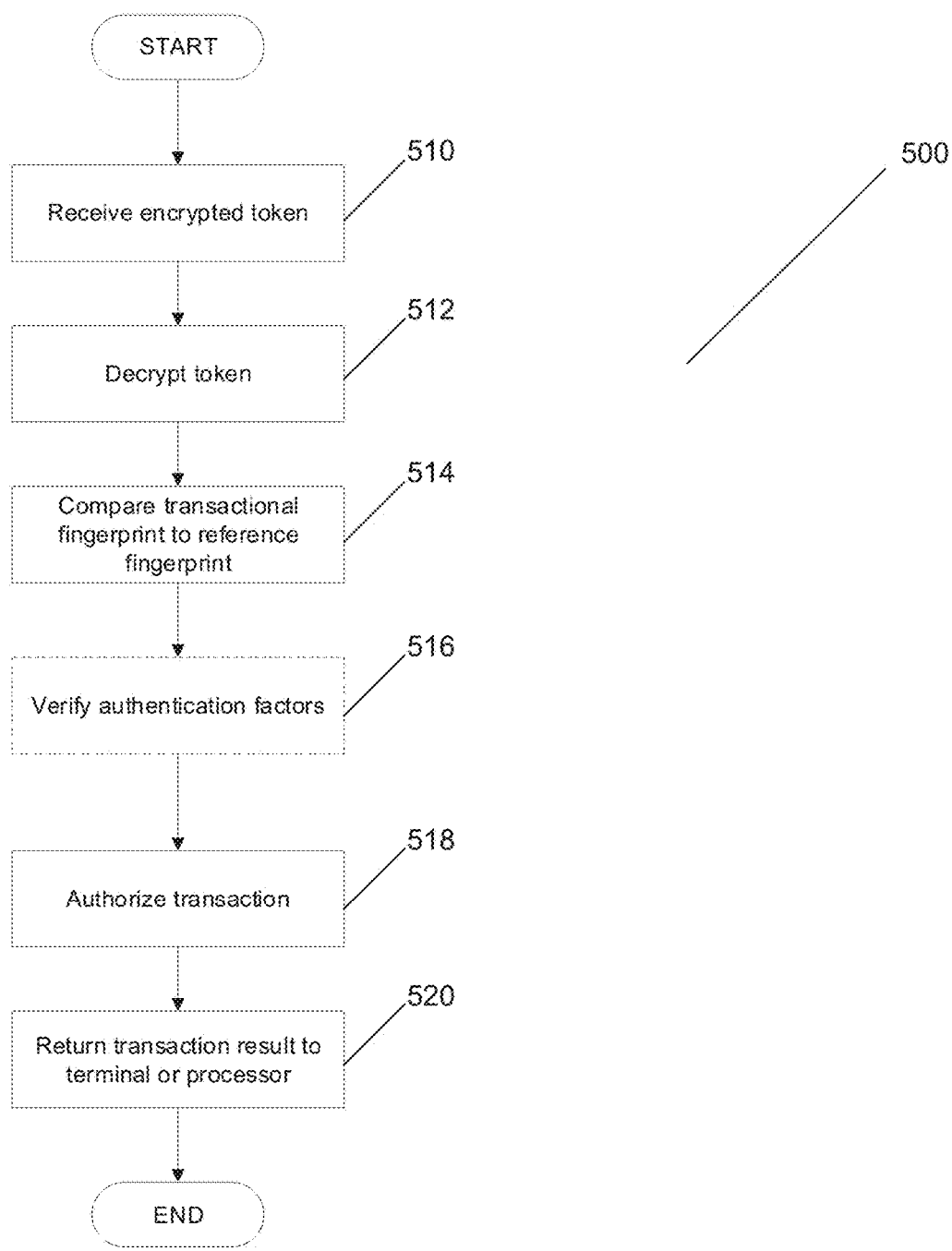
FIG. 5 illustrates a flow diagram for a process performed by a host server to authenticate a digital token in accordance with an embodiment of the invention.

A process for receiving and processing a digital token in accordance with an embodiment of the invention is illustrated in FIG. 5. In several embodiments, a host or transaction processor may be configured to execute the illustrated process. The process 500 includes receiving (510) a digital token from a payment terminal or a user authentication terminal. If the digital token is encrypted, the digital token may be decrypted (512). And, at least some of the information may be extracted (514) from the digital token.

A transactional magnetic fingerprint extracted from the digital token may be compared (516) to a reference magnetic fingerprint or may be transmitted to a magnetic fingerprint authentication server that can make such a comparison. Processes for making a comparison to a reference magnetic fingerprint are described in U.S. Pat. Nos. 7,478,751; 7,377, 433; and 7,210,627 and the relevant disclosure of which is incorporated by reference herein in its entirety. In several embodiments, a correlation score may be generated that represents the degree of correlation between the transactional magnetic fingerprint and reference magnetic fingerprint. The correlation score may be compared to a threshold fingerprint match value or may be transmitted back to the host or transaction processor to be compared to a threshold fingerprint match value when the fingerprint comparison may be performed by a magnetic fingerprint authentication server.

Other authentication factors extracted from the digital token may be verified (518). Authentication factors are another piece of information to verify the identity of the cardholder, user, payment card, and/or identification card. These authentication factors may include, but are not limited to, a personal identification number (PIN), password, biometric data, unique number identifying the magnetic stripe card, and/or other information that may be used to uniquely identify the magnetic stripe card or cardholder.

The payment transaction or user session may be authorized (520) using the at least some of the information extracted from the digital token, such as cardholder information, user information, session information, and/or transaction information.

A payment transaction or user session result may be returned (522) to the payment terminal or user authentication terminal. In many embodiments, a result may be positive when the transactional magnetic fingerprint is a positive match to the reference magnetic fingerprint, a predetermined number of authentication factors are satisfied, and the transaction or session is authorized. Although specific processes are described above with respect to FIG. 5, any of a variety of processes may be utilized for processing a digital token in accordance with various embodiments of the invention.

A derived magnetic fingerprint may be used in the processes described above in place of the transactional magnetic fingerprint that is read from a magnetic stripe. Processes for generating a derived magnetic fingerprint from a transactional magnetic fingerprint are discussed below.

Derived Magnetic Fingerprints

In many embodiments of the invention, a derived magnetic fingerprint can substitute for a magnetic fingerprint for comparison purposes.

As will be discussed below, a derived magnetic fingerprint can be generated from any original magnetic fingerprint, such as a transactional or reference magnetic fingerprint, to have the same sequence length (total number of values with the sequence) and sequence depth (maximum absolute value of all values within the sequence) and to have a correlation to the original magnetic fingerprint within a certain precision. In further embodiments, a stochastic function may be used in generating a derived magnetic fingerprint so that it cannot be used to derive the original magnetic fingerprint within an acceptable brute force probability.

Figure 6:
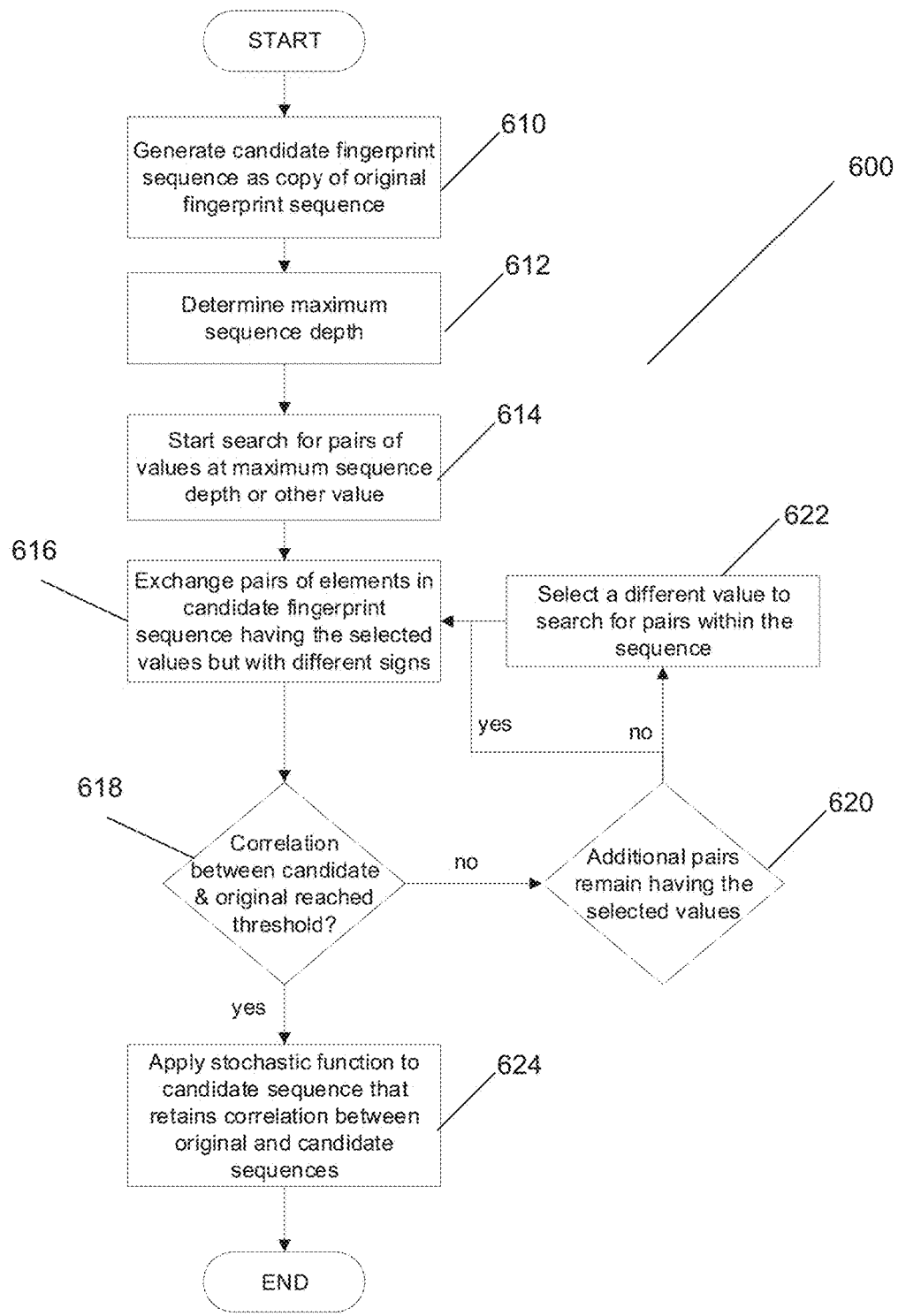
FIG. 6 illustrates a flow diagram to generate a derived magnetic fingerprint in accordance with an embodiment of the invention.

A process for generating a derived magnetic fingerprint from an original magnetic fingerprint in accordance with an embodiment of the invention is illustrated in FIG. 6. The process 600 includes creating (610) a copy of the original fingerprint sequence to use as the basis for a candidate sequence for a derived magnetic fingerprint. The maximum sequence depth of the candidate sequence may be determined (612). For example, if the largest value within the sequence is −3 or 3, then the maximum sequence depth is 3. In many embodiments, the process identifies (614) pairs of values within the sequence of processed measurements that forms the magnetic fingerprint having opposite signs within the sequence whose absolute values equal the maximum sequence depth. For example, if the depth is 3, pairs of values of (3, −3) are selected. The values within a selected pair are swapped (616). This will decrease the covariance between the candidate sequence and the original magnetic fingerprint without changing the standard deviation of the candidate sequence. Additional pairs may have their values swapped until a desired correlation is reached (618). Selection may continue (620) with pairs having the same values. If there are no pairs remaining in the sequence having the selected values or if the granularity of covariance change is too large when approaching the desired value, selection may continue (622) with pairs having a different absolute value. In many embodiments, the next lower absolute value may be selected, for example (2, −2). Selection of pairs and exchanging values within each pair may continue until the desired correlation is reached.

A stochastic process that retains the correlation between the original magnetic fingerprint and the candidate sequence may be applied (624) to the candidate sequence. In many embodiments, the stochastic process increases the difficulty of recovering the original magnetic fingerprint from the candidate sequence. When the processes are completed, the resulting candidate sequence may be taken as a derived magnetic fingerprint. Although specific processes are described above with respect to FIG. 6, any of a variety of processes may be utilized for generating a derived magnetic fingerprint in accordance with various embodiments of the invention.

A subsequent iteration of a process for generating a derived magnetic fingerprint may incorporate variations such that a subsequent derived magnetic fingerprint may be different from the previous derived magnetic fingerprint and/or has a different correlation to the original magnetic fingerprint. In several embodiments, a subsequent iteration chooses at least one different pair of values to swap (616).

In additional embodiments, the threshold correlation used (618) for a subsequent iteration may be lower than the threshold used in a previous iteration. The threshold correlation may be further reduced in additional iterations such that the threshold correlation may be below a threshold fingerprint match value used for verifying a derived magnetic fingerprint against an original magnetic fingerprint or a reference magnetic fingerprint. Derived magnetic fingerprints that have a correlation below the threshold thus may be rejected upon authentication. When a predetermined number of derived magnetic fingerprints fail authentication, the system may require that a new reference magnetic fingerprint be acquired by reading the magnetic stripe card or other method. Although a specific process is described above with respect to FIG. 6, any of a variety of processes may be utilized for generating a derived magnetic fingerprint in accordance with embodiments of the invention.

The process described to create a derived magnetic fingerprint may add an additional layer of security for the transactional magnetic fingerprint. This additional layer of security prevents an attacker from reverse-deriving the transactional magnetic fingerprint from the derived magnetic fingerprint. As such, creating a secure, derived magnetic fingerprint may allow for the derived fingerprint to be placed on a mobile device, personal computer, and/or any other device, which may not be secure or may be less secure than the processing environment used in the creation of the derived magnetic fingerprint. As such, a derived magnetic fingerprint may be loaded onto a mobile device and used at a later point in making a payment transaction or authenticating a user. Additionally, for even more security, the derived magnetic fingerprint may be re-encrypted on a mobile device, personal computer, and/or any other computing device for additional security at the option of a user. In several embodiments, a derived magnetic fingerprint may be stored in secure memory or a secure processing environment on a computing device.

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method for authenticating a digital token used in a user authentication transaction comprising:
   receiving a digital token from a user authentication transaction terminal;
   extracting information from the digital token, wherein the information includes information describing a unique intrinsic characteristic of an electronically readable component of an identification card, user information, and session information, where:
      the information describing a unique intrinsic characteristic is a derived value differing from and correlating to a reference description of the unique intrinsic characteristic;
      the user information describes identifying information about a cardholder; and
      the session information describes information regarding a request for an authenticated communications session;
   comparing the extracted information describing the unique intrinsic characteristic to the reference description of the unique intrinsic characteristic to generate a correlation score;
   authorizing the user authentication transaction based on at least some of the extracted information from the digital token; and
   returning a user authentication transaction result to the user authentication transaction terminal, wherein:
      a positive result is returned, if the correlation score is at or above a threshold correlation value and the at least one other piece of information is valid; and
      a negative result is returned, if the correlation score is below the threshold correlation value or if the at least one other piece of information is not valid.

2. The method of claim 1, wherein:
   the digital token is encrypted; and
   the method further comprises decrypting the digital token.

3. The method of claim 1, wherein:
   the digital token includes authentication factors, where the authentication factors identify at least one of the group consisting of the cardholder and the payment card; and
   further comprises verifying the authentication factors.

4. The method of claim 3, wherein the authentication factors includes at least one of the group consisting of: a personal identification number (PIN), password, biometric data, and a unique number identifying the magnetic stripe card.

5. The method of claim 1, wherein the electronically readable component is a magnetic stripe.

6. The method of claim 5, wherein:
   the information describing the unique intrinsic characteristic is a transactional magnetic fingerprint representing a sequence identifying a unique remanent noise characteristic of the magnetic stripe; and
   the reference description is a reference magnetic fingerprint.

7. The method of claim 1, wherein the user information includes at least one of the group consisting of: a name of the cardholder, home address of the user, work address of the user, access permissions, access attempt location, biometric data and password.

8. The method of claim 1, wherein the session information includes at least one of the group consisting of: login time, encrypted data, session identifier, and login location.

9. A method for authenticating a digital token used in a payment transaction comprising:
   receiving a digital token from a payment transaction terminal;
   extracting information from the digital token, wherein the information includes information describing a unique intrinsic characteristic of an electronically readable component of a payment card, cardholder information, and transaction information, where:
      the information describing a unique intrinsic characteristic is a derived value differing from and correlating to a reference description of the unique intrinsic characteristic;
      the cardholder information describes identifying information about a cardholder; and
      the transaction information describes information regarding the type and amount of a payment transaction;
   comparing the extracted information describing the unique intrinsic characteristic to a reference description of the unique intrinsic characteristic;
   authorizing the payment transaction based on at least some of the extracted information from the digital token; and
   returning a payment transaction result to the payment terminal, wherein:
      a positive result is returned, if the correlation score is at or above a threshold correlation value and the at least one other piece of information is valid; and
      a negative result is returned, if the correlation score is below the threshold correlation value or if the at least one other piece of information is not valid.

10. The method of claim 9, wherein:
    the digital token is encrypted; and
    the method further comprises decrypting the digital token.

11. The method of claim 9, wherein:
    the digital token includes authentication factors, where the authentication factors identify at least one of the group consisting of: the cardholder and the payment card; and
    further comprising verifying the authentication factors.

12. The method of claim 11, wherein the authentication factors includes at least one of the group consisting of: a personal identification number (PIN), password, biometric data, and a unique number identifying the magnetic stripe card.

13. The method of claim 9, wherein the electronically readable component is a magnetic stripe.

14. The method of claim 13, wherein:
    the information describing the unique intrinsic characteristic is a transactional magnetic fingerprint representing a sequence identifying a unique remanent noise characteristic of the magnetic stripe; and
    the reference description is a reference magnetic fingerprint.

15. The method of claim 9, wherein the cardholder information includes at least one of the group consisting of: a name of the cardholder, account information for an account associated with the cardholder, shipping address of the cardholder, and billing address of the cardholder.

16. The method of claim 9, wherein the transaction information includes at least one of the group consisting of: routing information for a beneficiary account, routing information for a destination account, a transaction amount, perso codes, and a session identifier.

* * * * *